(12) United States Patent
Kurashige

(10) Patent No.: US 10,075,698 B2
(45) Date of Patent: *Sep. 11, 2018

(54) PROJECTOR AND PROJECTION DISPLAY DEVICE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/472,601

(22) Filed: Mar. 29, 2017

(65) Prior Publication Data

US 2017/0214908 A1    Jul. 27, 2017

Related U.S. Application Data

(63) Continuation of application No. 14/899,612, filed as application No. PCT/JP2014/066250 on Jun. 19, 2014, now Pat. No. 9,641,828.

(30) Foreign Application Priority Data

Jun. 25, 2013 (JP) .................... 2013-132824

(51) Int. Cl.
*H04N 13/04* (2006.01)
*G02B 27/48* (2006.01)
(Continued)

(52) U.S. Cl.
CPC ....... *H04N 13/0438* (2013.01); *G02B 3/0006* (2013.01); *G02B 5/0252* (2013.01);
(Continued)

(58) Field of Classification Search
CPC ............. G03B 21/208; G02B 27/625; G02B 27/2033; G02B 27/2073; G02B 27/26;
(Continued)

(56) References Cited

U.S. PATENT DOCUMENTS

2006/0072209 A1    4/2006 Karasawa et al.
2008/0094700 A1    4/2008 Uehara
(Continued)

FOREIGN PATENT DOCUMENTS

JP    2007-121842 A1    5/2007
JP    2009-151221 A1    7/2009
(Continued)

OTHER PUBLICATIONS

International Search Report (Application No. PCT/JP2014/066250) dated Sep. 9, 2014.

(Continued)

*Primary Examiner* — Sultan Chowdhury
(74) *Attorney, Agent, or Firm* — Burr & Brown, PLLC

(57) ABSTRACT

A projector includes: an optical element including first and second regions and which diffuses light that has entered the regions; an irradiation device for irradiating the first and second regions with light in a time-divisional manner; a polarization control means disposed on a plane (B) which is conjugate to a plane (A) on which the optical element is disposed; and a spatial light modulator disposed in a light path from the optical element to the polarization control means and which is illuminated with light that has been diffused by the first and second regions. The polarization control means controls the polarization state of light so that light that has been diffused by the first region becomes light of a first polarization component, and light that has been
(Continued)

diffused by the second region becomes light of a second polarization component which differs from the first polarization component.

10 Claims, 8 Drawing Sheets

(51) Int. Cl.
    *G02B 5/02*         (2006.01)
    *G02B 3/00*         (2006.01)
    *G02B 5/30*         (2006.01)
    *H04N 9/31*         (2006.01)
    *G03B 35/26*       (2006.01)

(52) U.S. Cl.
    CPC ........... *G02B 5/3083* (2013.01); *G02B 27/48* (2013.01); *G03B 35/26* (2013.01); *H04N 9/3161* (2013.01); *H04N 9/3164* (2013.01); *H04N 13/0459* (2013.01)

(58) Field of Classification Search
    CPC .............. G02B 27/145; G02B 27/1033; G02B 27/2214; H04N 9/315; H04N 9/3111; H04N 9/3105; H04N 9/3161
    See application file for complete search history.

(56) References Cited

U.S. PATENT DOCUMENTS

| 2009/0161072 | A1 | 6/2009 | Yamauchi et al. |
| 2010/0149222 | A1* | 6/2010 | Welford ............... H01S 3/0941 345/690 |
| 2012/0147334 | A1* | 6/2012 | Mizushima .......... G02B 13/007 353/31 |
| 2013/0169936 | A1 | 7/2013 | Kurashige et al. |

FOREIGN PATENT DOCUMENTS

| JP | 2012-226272 A1 | 11/2012 |
| WO | 2012/033178 A1 | 3/2012 |

OTHER PUBLICATIONS

International Preliminary Report on Patentability (Application No. PCT/JP2014/066250) dated Jan. 7, 2016.

* cited by examiner

PROJECTOR AND PROJECTION DISPLAY DEVICE

CROSS REFERENCE TO RELATED APPLICATIONS

This application is a continuation of U.S. application Ser. No. 14/899,612, filed Dec. 18, 2015, which in turn is the National Stage of International Application No. PCT/JP2014/066250, filed Jun. 19, 2014, the entireties of which are incorporated herein by reference.

FIELD OF THE INVENTION

The present disclosure relates to a projector for projecting light and a projection display device including the projector, and more particularly to a projector capable of projecting image lights formed of lights of different polarization components, and a projection display device including the projector.

BACKGROUND OF THE INVENTION

As disclosed e.g. in WO 2012/033178A1, research and development has been conducted on a projection display device which projects image lights formed of lights of different polarization components. Such a projection display device can be used as a device which, in combination with dedicated glasses, displays three-dimensional images by a so-called "passive polarization method" or "polarizing glass method". In order to project image lights of different polarization components, it is necessary to provide the same number of projectors as the number of the image lights, or to incorporate the same number, as the number of the image lights, of spatial light modulators for forming images and illumination devices for illuminating the special light modulators into one projector. As an alternative, a method is employed which comprises switching polarization components in a time-divisional manner by using a device having a liquid crystal element after emitting image lights from a projector. The conventional projectors and projection display devices thus involve the problem of being large-sized and complicated.

On the other hand, in the projector and the projection display device disclosed in WO 2012/033178A1, a spatial light modulator is illuminated time-divisionally with lights of different polarization components and, in addition, modulated images corresponding to the lights of different polarization components are formed in a time-divisional manner. Such projector and projection display device can display 3D images while achieving a significant reduction in the size of the device.

A projector using a source of coherent light, such as laser light, has the problem of the formation of speckles. The "speckles" refer to a speckle pattern that may appear on a scattering surface when irradiated with coherent light such as laser light and, when formed on a screen, are observed as speckled uneven luminance (uneven brightness) which can have a physiologically harmful influence on the viewer. In the projector and the projection display device disclosed in WO 2012/033178A1, an optical element is irradiated with coherent light in such a manner that the coherent light scans the optical element. This can effectively prevent the formation of speckles on a region when it is illuminated with illumination light from the optical element. The related-art projector and projection display device are favorable also in this regard.

SUMMARY OF THE INVENTION

In the projection display device disclosed in WO 2012/033178A1, the polarization state of illumination light that illuminates the spatial light modulator changes time-divisionally. Therefore, it is necessary to use a spatial light modulator, such as a digital micro-display (DMD) device, which is capable of forming a modulated image without being dependent on the polarization state of illumination light. Thus, it is not possible to use a spatial light modulator that forms a modulated image depending on the polarization state of illumination light, for example, a liquid crystal micro-display that forms a modulated image by illumination light of a particular polarization component. It is an object of the present invention to eliminate the restriction on the use of a spatial light modulator in the device disclosed in WO 2012/033178A1.

A projector according to some embodiments comprises: an optical element including a first region and a second region, the optical element diffusing light that has entered the regions; an irradiation device for irradiating the first region and the second region of the optical element with light in a time-divisional manner; polarization control means disposed on a plane which is conjugate to a plane on which the optical element is disposed; and a spatial light modulator disposed in a light path from the optical element to the polarization control means, the spatial light modulator being illuminated with light that has been diffused by the first region of the optical element and illuminated with light that has been diffused by the second region of the optical element, wherein the polarization control means is configured to control the polarization state of light so that light that has been diffused by the first region of the optical element and later exited the spatial light modulator becomes light of a first polarization component, and light that has been diffused by the second region of the optical element and later exited the spatial light modulator becomes light of a second polarization component which differs from the first polarization component.

In the projector according to some embodiments, the irradiation device may irradiate the optical element with light in such a manner that the light scans the optical element; and lights that have entered the optical element at various positions in the first region and have been diffused each illuminate the spatial light modulator, and lights that have entered the optical element at various positions in the second region and have been diffused each illuminate the spatial light modulator.

In the projector according to some embodiments, the irradiation device may include a first light source for irradiating the first region of the optical element with light, and a second light source for irradiating the second region of the optical element with light, the first light source and the second light source emitting light alternately.

In the projector according to some embodiments, the optical element may include a hologram recording medium.

In the projector according to some embodiments, the optical element may include a lens array.

In the projector according to some embodiments, the irradiation device may emit linearly-polarized light whose vibration direction is constant; and the polarization control means may include a half-wavelength plate provided on a light path of light that has been diffused by the first region of the optical element.

In the projector according to some embodiments, the polarization control means may further include a quarter-wavelength plate provided on a light path of light that has been diffused by the first region of the optical element, and on a light path of light that has been diffused by the second region of the optical element.

In the projector according to some embodiments, the irradiation device may emit circularly-polarized or elliptically-polarized light whose circling direction is constant; and the polarization control means may include a half-wavelength plate provided on a light path of light that has been diffused by the first region of the optical element.

In the projector according to some embodiments, the irradiation device may emit non-polarized light; and the polarization control means may include a first polarizing plate provided on a light path of light that has been diffused by the first region of the optical element, the first polarizing plate selectively transmitting the first polarization component, and a second polarizing plate provided on a light path of light that has been diffused by the second region of the optical element, the second polarizing plate selectively transmitting the second polarization component.

A projection display device according to some embodiments comprises: any one of the above-described projectors; and a screen onto which a modulated image formed on the spatial light modulator is projected.

According to the projector and the projection display device of some embodiments, a variety of spatial light modulators can be used, regardless of whether they are polarization-dependent or not, to project image lights formed of lights of different polarization components.

DETAILED DESCRIPTION OF THE INVENTION

Figure 1:
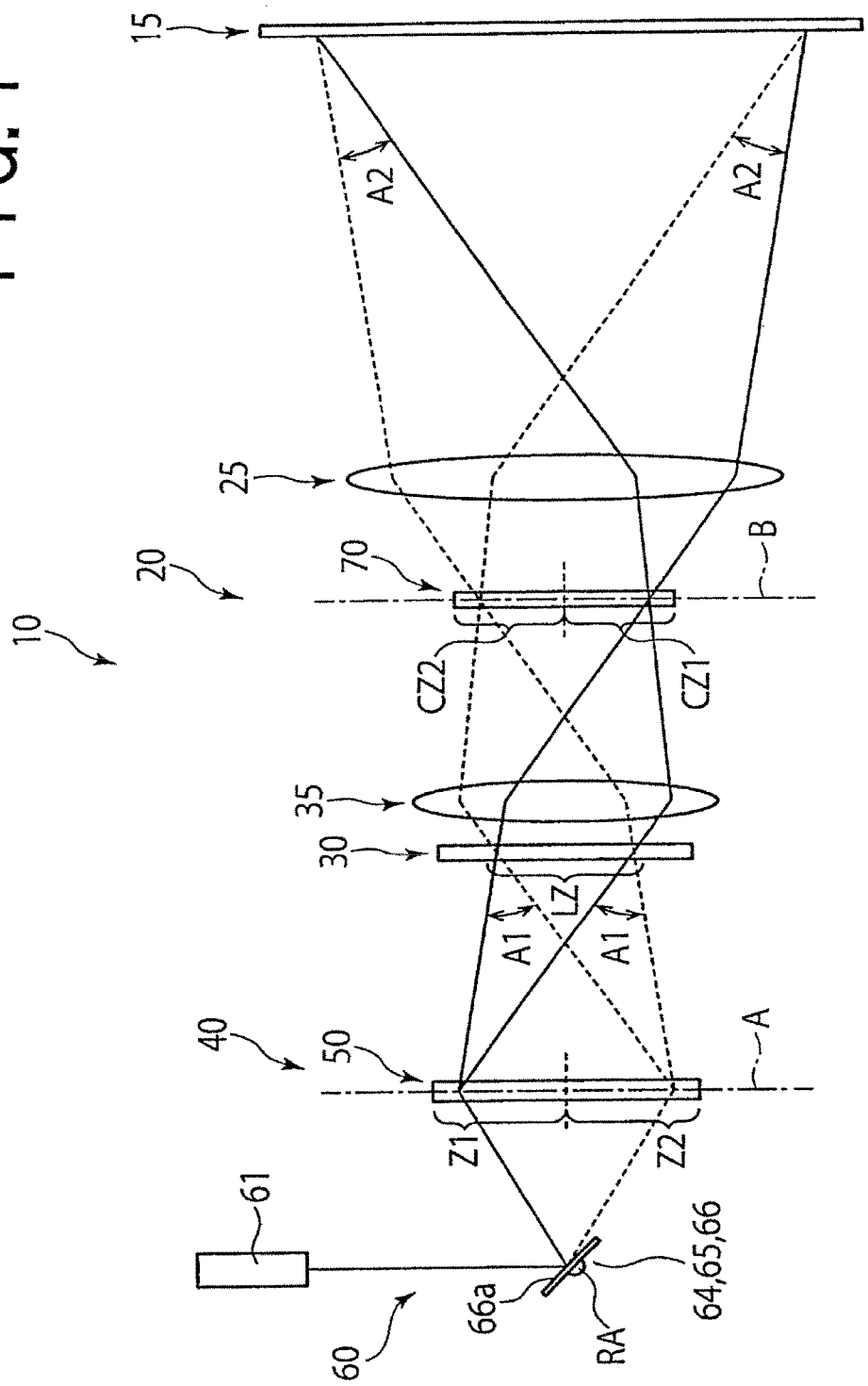
FIG. 1 is a diagram illustrating an embodiment of the present invention and showing a schematic construction of a projector and a projection display device.

Preferred embodiments of the present invention will now be described with reference to the drawings. In the drawings attached hereto, scales, horizontal to vertical dimensional ratios, etc. are exaggeratingly modified from those of the real things for the sake of illustration and easier understanding.

The projection display device 10 shown in FIG. 1 includes a screen 15 and a projector 20 for projecting image light. The projector 20 includes an optical element 50 including a first region Z1 and a second region Z2 and which diffuses light that has entered the regions Z1, Z2, an irradiation device 60 for irradiating the first region Z1 and the second region Z2 of the optical element 50 with light in a time-divisional manner, a polarization control means 70 for controlling the polarization state of light from the optical element 50, and a spatial light modulator 30 disposed in a light path from the optical element 50 to the polarization control means 70. The projector 20 also includes a relay optical system 35 disposed in a light path from the optical element 50 to the polarization control means 70, and an optical projection system 25 disposed in a light path from the polarization control means 70 to the screen 15. The irradiation device 60 and the optical element 50 constitute an illumination device 40 which illuminates an illumination region LZ lying on an imaginary plane. The spatial light modulator 30 is disposed such that it overlaps with the illumination region LZ, whereby the spatial light modulator 30 is to be illuminated by the illumination device 40.

The projector 20 described herein is configured to project a first modulated image formed by light of a first polarization component, and a second modulated image formed by light of a second polarization component onto the screen 15 in a time-divisional manner. Control of light to be projected onto the screen 15 is performed on image light that forms a modulated image by the polarization control means 70 disposed downstream of the spatial light modulator 30. Therefore, no particular limitation is placed on the polarization state of illumination light from the illumination device 40, illuminating the spatial light modulator 30. In the embodiment described below, the illumination device 40 illuminates the illumination region LZ, and is designed to obscure speckles. The respective components will now be described.

At the outset, the optical element 50 and the irradiation device 60, constituting the illumination device 40, will be described with reference to FIGS. 1 and 2. As shown in FIG. 1, the illumination device 40 includes the optical element 50 for directing the traveling direction of light toward the illumination region LZ, and the irradiation device 60 for irradiating the optical element 50 with light, in particular coherent light in this embodiment. In particular, in the projector 20 described herein, the optical element 50 includes the first region Z1 and the second region Z2, and diffuses light that has entered the region Z1 or Z2. On the other hand, the irradiation device 60 irradiates the first region Z1 and the second region Z2 of the optical element 50 with light in a time-divisional manner.

As shown in FIG. 1, the first region Z1 and the second region Z2 of the optical element 50 are arranged along the planar direction of the optical element 50. In particular in the illustrated example, the optical element 50 is halved vertically in the Figure into the upper first region ZI and the lower second region Z2.

In the example illustrated in FIG. 1, the irradiation device 60 irradiates the optical element 50 with coherent light in such a manner that the coherent light scans the optical element 50 along a path extending across the first region Z1 and the second region Z2. Accordingly, an area of the optical element 50, which is being irradiated with coherent light by the irradiation device 60 at a certain moment, is a portion of the surface of the optical element 50 and, in particular in the illustrated example, is a micro area that can be called a point. The irradiation device 60 thus irradiates the first region Z1 and the second region Z2 of the optical element 50 with coherent light in a time-divisional manner.

The irradiation device 60 includes a light source 61 for emitting coherent light of a particular wavelength band, e.g. a laser light source, and a deflecting device 64 for directing the traveling direction of light from the light source 61 toward the optical element 50. The light source 61, in relation to the below-described polarization control means 70, emits light of a particular polarization component, e.g. linearly-polarized light whose vibration direction is constant, or circularly-polarized or elliptically-polarized light whose circling direction is constant. The deflecting device 64 allows coherent light generated by the light source 61 to travel along a light path of a light beam constituting a divergent light flux and enter the optical element 50.

In the illustrated example, the deflecting device 64 is configured as a scanning device 65 which changes with time the light path of coherent light from the light source 61. The scanning device 65 comprises a mirror device 66 for reflecting light from the light source 61. The direction of the reflective surface 66a of the mirror device 66 changes with time. In the illustrated example, the mirror device 66 turns on an axis RA. Accordingly, irradiating light, emitted from the irradiation device 60, travels toward the optical element 50 along a light path of a light beam constituting a divergent light flux diverging from the axis RA.

The optical element 50 will now be described. The optical element 50 functions as a light diffusing element or component. The optical element 50 may include a lens array 51 formed in accordance with the incident direction of light from the irradiation device 60. The "lens array" herein refers to an assembly of small lenses also called unit lenses, and functions as an element that changes the traveling direction of light by refraction or reflection.

In the illustrated example, the optical element 50 diffuses light entering an area of the first region Z1, in other words, light coming from the irradiation device 60 and entering a micro area which can be called a point, at least to the illumination region LZ, and diffuses light entering an area of the second region Z2, in other words, light coming from the irradiation device 60 and entering a micro area which can be called a point, at least to the illumination region LZ. In particular, in the illustrated example, the optical element 50 diffuses light coming from the irradiation device 60 and entering a position in the first region Z1 or in the second region Z2, i.e. light traveling along a light path of a light beam constituting a divergent light flux diverging from the axis RA and entering a position in the first region Z1 or in the second region Z2, to the illumination region LZ. In other words, the optical element 50 illuminates the same illumination region LZ by diffusing light coming from the irradiation device 60 and entering each position in the first region Z1 or in the second region Z2.

Figure 2:
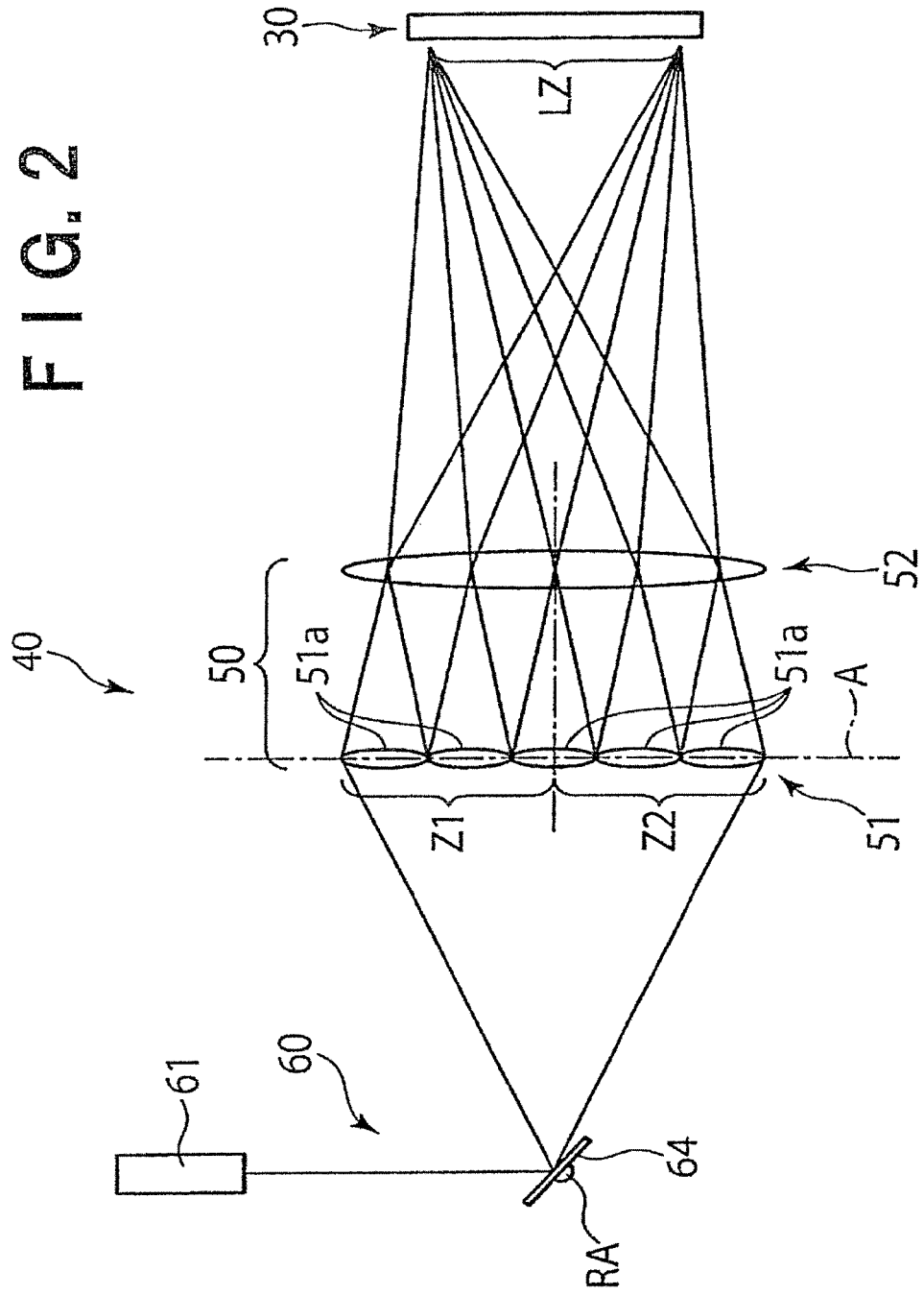
FIG. 2 is a side view showing an example of an optical element included in the projector of FIG. 1.

In the example illustrated in FIG. 2, the optical element 50 comprises the lens array 51 configured as a fly-eye lens consisting of convex unit lenses 51a arranged in a matrix pattern, and a field lens 52 disposed opposite the lens array 51. In the optical element 50 of FIG. 2, the lens array 51 is disposed outermost on the light entrance side of the optical element 50 and receives light from the irradiation device 60. Each unit lens 51a, constituting the lens array 51, converges incident light that has been traveling along a light path of a light beam constituting a divergent light flux diverging from the axis RA. The field lens 52 is disposed on a plane defined by the convergence points of the unit lenses 51a, and superimposes lights from the convex lenses in the illumination region LZ. In order to control the divergent angle of the divergent light emitted from the irradiation device 60, a regulating means such as a collimator lens may be provided on the incident light path to the lens array 51.

Figure 3:
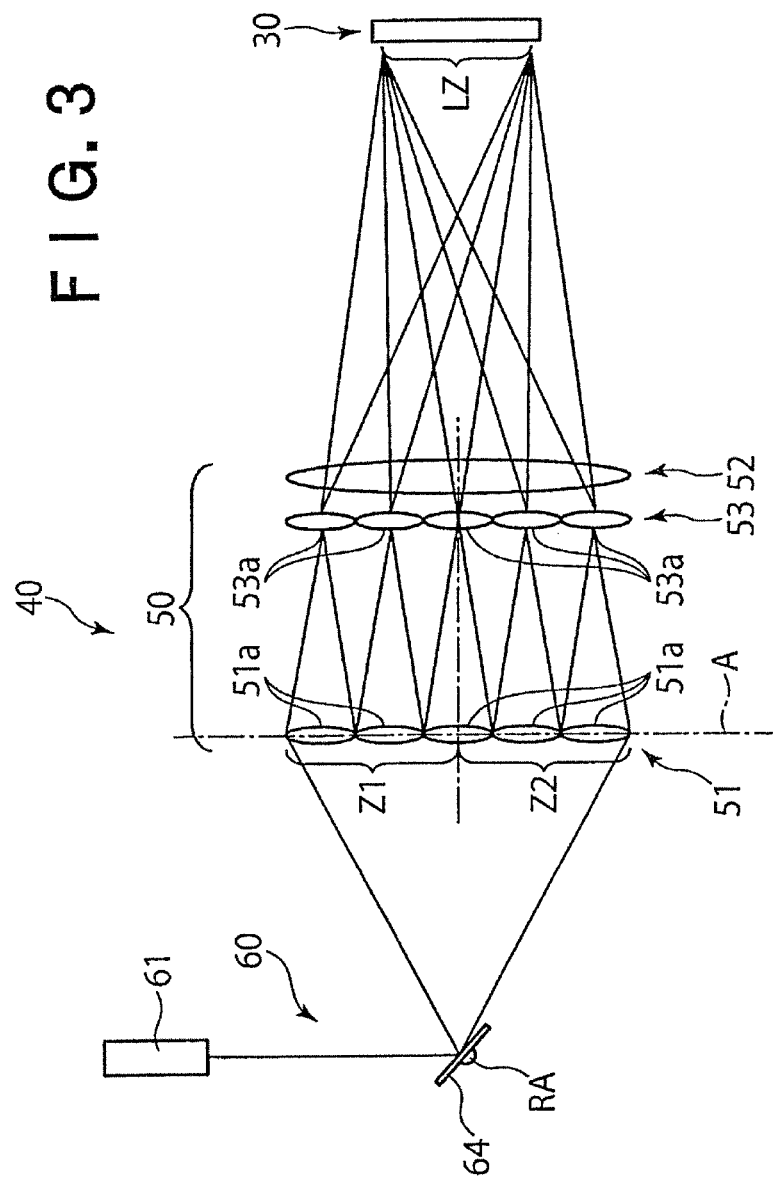
FIG. 3 is a diagram corresponding to FIG. 2, showing another example of an optical element.

In the example illustrated in FIG. 3, in addition to the lens array 51 and the field lens 52 shown in FIG. 2, the optical element 50 further comprises a second lens array 53 disposed between them. In the example illustrated in FIG. 3, as with the lens array 51, the second lens array 53 is configured as a fly-eye lens consisting of convex unit lenses 53a arranged in a matrix pattern. The second lens array 53 is disposed such that each unit lens 53a is positioned on the convergence point of each unit lens 51a of the lens array 51. In the optical element 50 of FIG. 3, each unit lens 53a of the second lens array 53 allows light from the lens array 51 to diverge. Divergent lights from the unit lenses 53a of the second lens array 53 are superimposed in the illumination region LZ.

The spatial light modulator 30 will now be described. The spatial light modulator 30 is disposed in the illumination region LZ. The spatial light modulator 30 is illuminated by the irradiation device 60, and forms a modulated image. As described above, light from the illumination device 40 illuminates only the entire illumination region LZ. Therefore, the light entrance surface of the spatial light modulator 30 preferably has the same shape and the same size as the illumination region LZ to be irradiated with light by the illumination device 40. This enables light from the illumination device 40 to be used with high efficiency in the formation of a modulated image.

There is no particular limitation on the spatial light modulator 30; various known spatial light modulators can be used. As will be described in detail below, the polarization control means 70 for controlling the polarization state of light are provided downstream of the spatial light modulator 30 along the light path. Though depending on what control method is employed to control the polarization state of light by the polarization control means 70, it is, in principle, only necessary to keep constant the polarization state of light coming from the illumination device 40 and entering the spatial light modulator 30. Therefore, it is possible to use as the spatial light modulator 30 not only a spatial light modulator that forms a modulated image without utilizing polarization, e.g. a digital mirror device (DMD), but also a transmissive liquid crystal micro-display or a reflective LCoS (Liquid Crystal on Silicon, registered trademark) that forms a modulated image utilizing polarization.

In the case where the spatial light modulator 30 is a transmissive liquid crystal micro-display as in the embodiment illustrated in FIG. 1, the spatial light modulator 30, illuminated planarly by the illumination device 40, transmits coherent light selectively for each pixel, thereby forming a modulated image on the screen of the display constituting the spatial light modulator 30. The modulated image thus obtained is finally projected by the optical projection system 25 onto the screen 15 while maintaining or changing the size at a particular magnification. Thus, the modulated image, whose size has been maintained or changed, generally enlarged, is displayed on the screen 15; a viewer can view the displayed image. The screen 15 may be configured either as a transmissive screen or as a reflective screen.

The coherent light projected onto the screen 15 is diffused, and perceived by the viewer as an image. The diffusion of the coherent light on the screen 15 causes interference, resulting in the formation of speckles. In the projection display device 10 described herein, the illumination device 40 illuminates the illumination region LZ, overlapping with the spatial light modulator 30, with coherent light whose angle changes with time. More specifically, the illumination device 40 illuminates the illumination region LZ with diffused coherent light whose incident angle changes with time. Consequently, the incident angle of light changes with time also on the screen 15, and the pattern of diffusion of coherent light on the screen 15 also changes with time. Accordingly, speckles formed by the diffusion of coherent light are time-averaged and obscured.

The relay optical system 35 and the polarization control means 70 will now be described. The relay optical system 35 constitutes an optical imaging system for the optical element 50 and, in the illustrated embodiment, also acts as a field lens. The polarization control means 70, on the other hand, control the polarization state of light so that light that has been diffused by the first region Z1 of the optical element 50 and later exited the spatial light modulator 30 becomes light of a first polarization component, and light that has been diffused by the second region Z2 of the optical element 50 and later exited the spatial light modulator 30 becomes light of a second polarization component which differs from the first polarization component. Light exiting the spatial light modulator 30 already is an image light that forms a modulated image. The polarization control means 70 controls the polarization state of the image light depending on whether the image light comes via the first region Z1 of the optical element 50 or via the second region Z2 of the optical element 50.

The relay optical system 35 that functions as an imaging element converges light, diverging from a position on the plane A of the optical element 50, on a point on the conjugate plane B which is conjugate to the plane A. Thus, the conjugate plane B is an image plane for the plane A. As shown in FIG. 1, the optical element 50 is disposed on the plane A, and the below-described polarization control means 70 are disposed on the conjugate plane B. Thus, the optical element 50 is disposed such that it at least partially overlaps with the plane A, and the polarization control means 70 are disposed such that it at least partially overlaps with the conjugate plane B. In the example illustrated in FIGS. 2 and 3, the optical element 50 includes a number of lens elements, and the lens elements positioned outermost on the light entrance side are arranged on the plane A. In the example illustrated in FIG. 1, the relay optical system 35 is comprised of a single field lens. Therefore, light that has been diffused at a position in the first region Z1 of the optical element 50, which is the upper region in the Figure, converges on a corresponding position in the first control region CZ1 of the polarization control means 70, which is the lower region in the Figure. On the other hand, light that has been diffused at a position in the second region Z2 of the optical element 50, which is the lower region in the Figure, converges on a corresponding position in the second control region CZ2 of the polarization control means 70, which is the upper region in the Figure.

Various elements capable of controlling the polarization state of light can be used to construct the polarization control means 70. More specifically, the polarization control means 70 can be formed by using different elements in the first control region CZ1 on the conjugate plane B that light enters which comes via the first region Z1 of the optical element 50 and in the second control region CZ2 on the conjugate plane B that light enters which comes via the second region Z2 of the optical element 50. In the example illustrated in FIG. 4, the polarization control means 70 comprise a first polarization control element 71 disposed in the first control region CZ1, and a second polarization control element 72 disposed across the first control region CZ1 and the second control region CZ2. The first polarization control element 71 is a half-wavelength plate 71a, and the second polarization control element 72 is a quarter-wavelength plate 72a.

Figure 4:
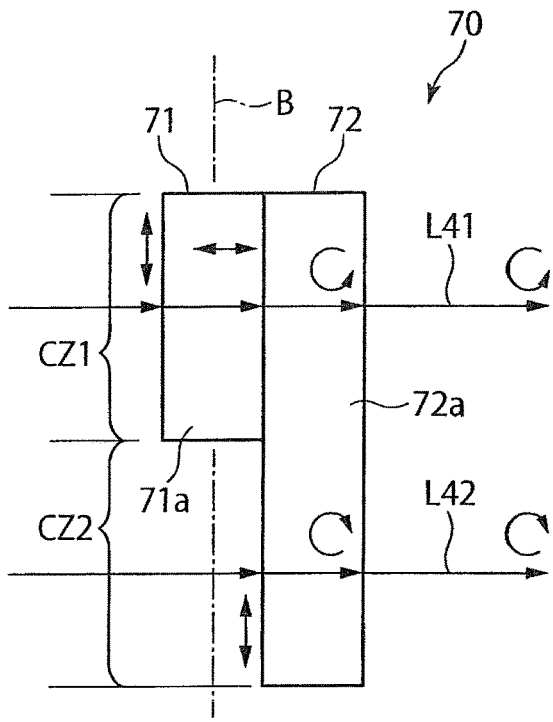
FIG. 4 is a side view showing an example of a polarization control means included in the projector of FIG. 1.

In the case where the light source 61 of the irradiation device 60 projects linearly-polarized light whose vibration direction is constant, in other words, linearly-polarized light having a certain polarization axis, light L41 that has reached the conjugate plane B via the first region Z1 of the optical element 50 enters the first polarization control element 71 and the second polarization control element 72 of the polarization control means 70 as shown in FIG. 4. The half-wavelength plate 71a as the first polarization control element 71 shifts the vibration direction, which is also called the polarization axis, of the linearly-polarized light L41 by 90°. The light L41 then enters the quarter-wavelength plate 72a as the second polarization control element 72, where the light L41 is converted from the linearly-polarized light to circularly-polarized light. On the other hand, light L42 that has reached the second conjugate plane B via the second region Z2 of the optical element 50 enters only the second polarization control element 72 of the polarization control means 70 without entering the first polarization control element 71. The light L42 is converted from the linearly-polarized light to circularly-polarized light by the second polarization control element 72.

Due to the presence/absence of the first polarization control element 71, the circling direction of the circular polarization of the light L41, which has traveled to the first control region CZ1 of the polarization control means 70 via the first region Z1 of the optical element 50, is opposite to that of the light L42 which has traveled to the second control region CZ2 via the second region Z2 of the optical element 50. For instance, in the example illustrated in FIG. 4, the light L41, which has traveled to the first control region CZ1 of the polarization control means 70 via the first region Z1 of the optical element 50, becomes left-handed circularly-polarized light (whose circling direction is counterclockwise) as a first polarization component, while the light L42, which has traveled to the second control region CZ2 of the polarization control means 70 via the second region Z2 of the optical element 50, becomes right-handed circularly-polarized light (whose circling direction is clockwise) as a second polarization component which differs from the first polarization component.

In the case where circularly-polarized light whose circling direction is constant is emitted from the light source 61 of the irradiation device 60, the circling direction of light which has traveled to the first control region CZ1 via the first region Z1 of the optical element 50 is reversed by the first polarization control element 71 of the polarization control means 70 of FIG. 4. The direction-reversed light which has traveled to the first control region CZ1 via the first region Z1 of the optical element 50, and light which has traveled to the second control region CZ2 via the second region Z2 of the optical element 50 are converted from the circularly-polarized light to linearly-polarized light. Thus, light which has traveled to the first control region CZ1 of the polarization control means 70 via the first region Z1 of the optical element 50 becomes linearly-polarized light vibrating in one direction as a first polarization component, while light which has traveled to the second control region CZ2 of the polarization control means 70 via the second region Z2 of the optical element 50 becomes linearly-polarized light vibrating in another direction which differs by 90° from the one direction, the vibration direction of the first polarization component.

Figure 5:
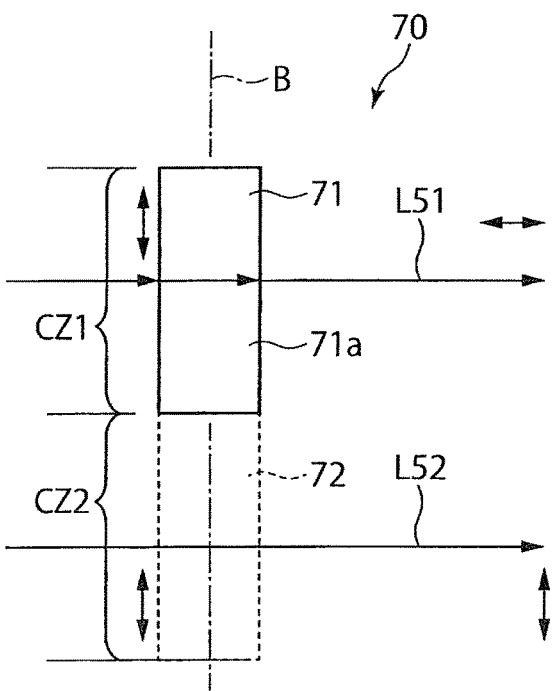
FIG. 5 is a diagram corresponding to FIG. 4, showing another example of a polarization control means.

FIG. 5 shows another example of the polarization control means 70. The polarization control means 70 shown in FIG. 5 only include the half-wavelength plate 71a as the first polarization control element 71 disposed in the first control region CZ1, and does not include the second polarization control element 72. According to the polarization control means 70 of FIG. 5, in the case where the light source 61 of the irradiation device 60 projects linearly-polarized light vibrating in a constant direction, light L51 which has traveled to the first control region CZ1 of the polarization control means 70 via the first region Z1 of the optical element 50 becomes linearly-polarized light vibrating in one direction, while light L52 which has traveled to the second control region CZ2 of the polarization control means 70 via the second region Z2 of the optical element 50 becomes linearly-polarized light vibrating in another direction which differs by 90° from the one direction. In the case where the light source 61 of the irradiation device 60 projects circularly-polarized or elliptically-polarized light circling in a constant direction, light which has traveled to the first control region CZ1 of the polarization control means 70 via the first region Z1 of the optical element 50 becomes circularly-polarized or elliptically-polarized light circling in one direction, while light which has traveled to the second control region CZ2 of the polarization control means 70 via the second region Z2 of the optical element 50 becomes circularly-polarized or elliptically-polarized light circling in the opposite direction to the one direction.

In yet another embodiment, the light source 61 of the irradiation device 60 may project non-polarized light, and the polarization control means 70 may include a first polarizing plate provided in the first control region CZ1, the first polarizing plate selectively transmitting a first polarization component, and a second polarizing plate provided in the second control region CZ2, the second polarizing plate selectively transmitting a second polarization component. In this embodiment, polarizers disposed such that their absorption axes are at right angles to each other can be used as the first polarizing plate and the second polarizing plate.

The operation of the projector 20 and the projection display device 10, having the above-described construction, will now be described.

First, the irradiation device 60 irradiates the optical element 50 with coherent light in such a manner that the coherent light scans the optical element 50. More specifically, coherent light that travels in a constant direction is generated by the light source 61, and the traveling direction of the coherent light is changed by the scanning device 65. The scanning device 65 performs a periodic turning movement so that light, emitted from the irradiation device 60, travels along a light path of a light beam constituting a divergent light flux and enters the optical element 50. The scan path of coherent light on the optical element 50 extends across the first region Z1 and the second region Z2. Thus, the irradiation device 60 irradiates the first region Z1 and the second region Z2 of the optical element 50 alternately in a time-divisional manner. Lights that have entered the optical element 50 at various positions in the first region Z1 each illuminate the illumination region LZ, and lights that have entered the optical element 50 at various positions in the second region Z2 each illuminate the illumination region LZ. The illumination device 40 can illuminate the illumination region LZ with coherent light in this manner.

As shown in FIG. 1, in the projector 20, the spatial light modulator 30 is disposed in a position overlapping with the illumination region LZ to be illuminated by the illumination device 40. Therefore, the spatial light modulator 30 is illuminated planarly by the illumination device 40, and transmits coherent light selectively for each pixel, thereby forming an image. In particular, the spatial light modulator 30 forms two modulated images, a first modulated image corresponding to coherent light that comes via the first region Z1 of the optical element 50 and enters the spatial light modulator 30 and a second modulated image corresponding to coherent light that comes via the second region Z2 of the optical element 50 and enters the spatial light modulator 30, in a time-divisional manner, i.e. in sequence with a short cycle time.

Light that forms the first modulated image and light that forms the second modulated image enter the polarization control means 70 provided on the second conjugate plane B which is conjugate to the first conjugate plane A on which the optical element 50 is disposed. The light that forms the first modulated image, coming from the first region Z1 of the optical element 50, enters the first control region CZ1 of the polarization control means 70 on the second conjugate plane B, while the light of the second modulated image, coming from the second region Z2 of the optical element 50, enters the second control region CZ2 of the polarization control means 70 on the second conjugate plane B. The light that forms the first modulated image and the light that forms the second modulated image are made lights of different polarization components by the polarization control means 70.

The light that forms the first modulated image and light that forms the second modulated image, having the thus-controlled polarization state, are projected by the optical projection system 25 onto the screen 15. Thus, first modulated image light, i.e. light of a first polarization component, and second modulated image light, i.e. light of a second polarization component which differs from the first polarization component, are projected onto the screen 15 in a time-divisional manner.

Therefore, by using dedicated glasses for a "polarized-glass method", which enable a viewer to view an image, formed by light of the first polarization component, with their one eye (e.g. right eye) and an image, formed by light of the second polarization component, with the other eye (e.g. left eye), the viewer can view with the one eye a first image displayed as a first modulated image on the screen 15, and can view with the other eye a second image displayed as a second modulated image on the screen 15. The first modulated image and the second modulated image are displayed alternately on the screen 15. However, if the time-divisional operation of the spatial light modulator 30, corresponding to the scanning operation of the irradiation device 60, is so fast that it cannot be detected by human eyes, then the viewer will observe displayed images as if the first image for the one eye continues to be continuously displayed and the second image for the other eye also continues to be continuously displayed. Thus, the observation of the first image with the one eye and the observation of the second image with the other eye are performed simultaneously, whereby the viewer can observe a 3D image.

Also by using dedicated glasses for a "liquid crystal shutter method", which enable a viewer to view an image with the right eye and view an image with the left eye alternately in a time-divisional manner, the viewer can view with their one eye (e.g. right eye) a first image displayed as a first modulated image on the screen 15, and can view with the other eye (e.g. left eye) a second image displayed as a second modulated image on the screen 15. Thus, the projector 20 described herein makes it possible for a viewer to view a 3D image not only by the use of dedicated glasses for a "polarized-glass method" but by the use of dedicated glasses for a "liquid crystal shutter method" as well.

When light projected from the light source 61 of the irradiation device 60 is coherent light, it is possible that light forming a modulated image, projected onto the screen 15, may cause interference due to diffusion, resulting in the formation of speckles. In this regard, the illumination device 40 of this embodiment can very effectively obscure speckles, as will be described below.

Multiplexing of various parameters such as polarization, phase, angle, time, etc. to increase the number of modes is considered an effective way to obscure speckles. The "modes" herein refer to speckle patterns which are independent from one another. For example, when coherent light is projected in different directions from a plurality of laser sources onto the same screen, there exist the same number of modes as the number of the laser light sources. When coherent light is projected onto a screen from a single laser light source in time-divisional different directions, there exist the same number of modes as the number of changes in the incident direction of coherent light during a time period which is so short that the change cannot be resolved by human eyes. When there are a large number of modes, light interference patterns are superimposed in an uncorrelated manner and averaged. This will obscure speckles observed by viewers' eyes.

In the above-described illumination device 40, the optical element 50 is irradiated with coherent light in such a manner that the coherent light scans the optical element 50. Coherent lights from the irradiation device 60, which have entered the optical element 50 at various positions, each illuminate the same entire illumination region LZ; however, the coherent lights illuminate the illumination region LZ in different illumination directions. Since the position on the optical element 50 at which coherent light enters changes with time, the incident direction of coherent light entering the illumination region LZ also changes with time.

The incident direction of coherent light, continually entering varying positions in the illumination region LZ, continues to change as shown by the arrows A1 in FIG. 1. Accordingly, light that forms each pixel of an image, formed by light that has exited the spatial light modulator 30, is projected onto a particular position on the screen 15 while changing its light path with time as shown by the arrows A2 in FIG. 1.

It will be appreciated from the foregoing that by using the above-described illumination device 40, the incident direction of coherent light changes with time at various positions on the screen 15 displaying an image, and that the change is so fast that it cannot be resolved by human eyes. Accordingly, superimposed uncorrelated scattering patterns of coherent light are observed by human eyes. Therefore, speckle patterns formed, corresponding to the scattering patterns, are superimposed and averaged when they are observed by a viewer. Speckles can thus be very effectively obscured to a viewer who is viewing an image displayed on the screen 15.

Conventional speckles observed by humans include not only screen-side speckles which are formed due to scattering of coherent light on the screen 15, but also projector-side speckles which are formed due to scattering of coherent light before it is projected onto the screen 15. Such a projector-side speckle pattern could be perceived by a viewer when the speckle pattern is projected onto the screen 15 via the spatial light modulator 30. However, according to this embodiment, coherent light continuously scans the optical element 50, and coherent lights, which have entered the optical element 50 at various positions, each irradiate the entire area of the illumination region LZ which overlaps with the spatial light modulator 30. Thus, the optical element 50 forms a new wavefront which is different from a previous waveform that forms a speckle pattern, resulting in complex and uniform illumination of the illumination region LZ, and also of the screen 15 via the spatial light modulator 30. The projector-side speckle pattern is made invisible by the formation of such a new waveform in the optical element 50.

According to the above-described embodiment, the plane B on which the polarization control means 70 is disposed is conjugate, through the relay optical system 35, to the plane A on which the optical element 50 is disposed. The irradiation device 60 irradiates the first region Z1 and the second region Z2 of the optical element 50 alternately; and the polarization control means 70 controls the polarization state of light so that light that has been diffused by the first region Z1 of the optical element 50 and later exited the spatial light modulator 30 becomes light of a first polarization component, and light that has been diffused by the second region Z2 of the optical element 50 and later exited the spatial light modulator 30 becomes light of a second polarization component which differs from the first polarization component. Thus, the projector 20 projects first image light, i.e. light of the first polarization component, and second image light, i.e. light of the second polarization component, alternately onto the screen 15. Control of light to be projected onto the screen 15 is performed on image light that forms a modulated image by the polarization control means 70 disposed downstream of the spatial light modulator 30. Therefore, no particular limitation is placed on the polarization state of illumination light from the illumination device 40, illuminating the spatial light modulator 30. Therefore, it is possible to use as the spatial light modulator 30 not only a spatial light modulator that forms a modulated image without utilizing polarization, but also a transmissive liquid crystal micro-display or a reflective LCoS that forms a modulated image utilizing polarization. This significantly increases the freedom of design of the projector 20.

Various changes and modifications may be made to the embodiments described above. Some exemplary variations will now be described with reference to the relevant drawings. In the following description and relevant drawings, the same reference numerals are used to indicate the same or equivalent components as used in the above-described embodiments, and a duplicate description thereof is omitted.

Figure 6:
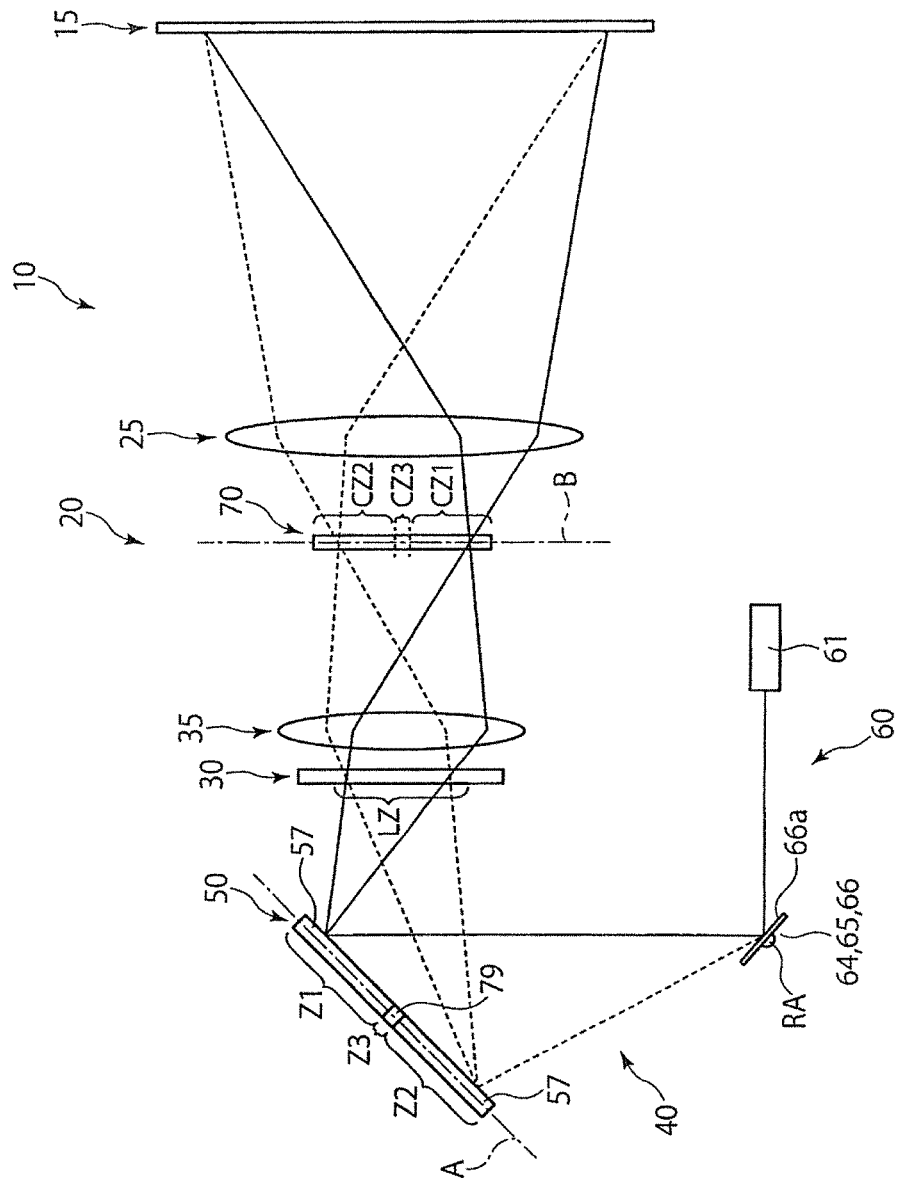
FIG. 6 is a diagram corresponding to FIG. 1, illustrating a variation of the optical element.

Though in the above-described embodiment the optical element 50 includes the lens array 51, the present invention is not limited to the use of such an optical element. The optical element 50 may include a hologram recording medium 57. In the example illustrated in FIG. 6, coherent light which has been emitted from the irradiation device 60 to scan the hologram recording medium 57 enters various positions (various points or areas) on the hologram recording medium 57 at an incident angle that meets the diffraction conditions of the hologram recording medium 57. Coherent lights coming from the irradiation device 60 and entering various positions on the hologram recording medium 57 are each diffracted by the hologram recording medium 57 and each illuminate areas which at least partly overlap each other. In the example illustrated in FIG. 6, coherent lights coming from the irradiation device 60 and entering various positions on the hologram recording medium 57 are each diffracted by the hologram recording medium 57 and each illuminate the same entire illumination region LZ. In particular, as shown in FIG. 6, coherent lights coming from the irradiation device 60 and entering various positions on the hologram recording medium 57 reproduce a superimposed image 5 of a scattering plate 6 in the illumination region LZ. Thus, coherent lights coming from the irradiation device 60 and entering various positions on the hologram recording medium 57 are each diffused (expanded) by the optical element 50, and enter the illumination region LZ.

Figure 7:
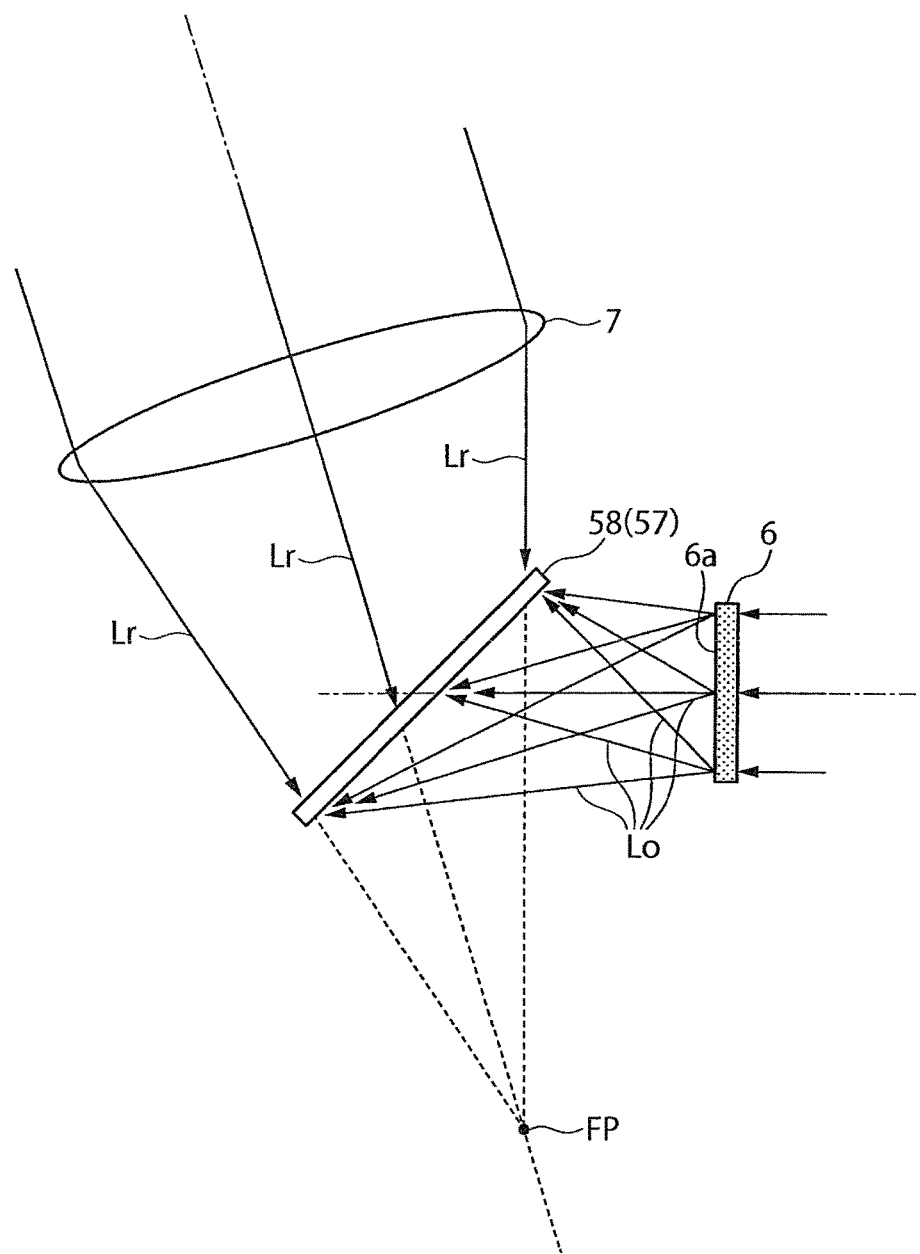
FIG. 7 is a diagram illustrating an exposure method for producing a hologram recording medium constituting the optical element of the projector of FIG. 6.

In the example illustrated in FIG. 6, a reflective volumetric hologram using a photopolymer is used as the hologram recording medium 57 that can exert such a diffraction effect on coherent light. As shown in FIG. 7, the hologram recording medium 57 is produced by using scattering light from the real scattering plate 6 as object light Lo. FIG. 7 illustrates exposure (hereinafter referred to as the exposure process) of a photosensitive hologram material 58, which is to make the hologram recording medium 57, to reference lights Lr, composed of coherent light, and to object lights Lo.

The reference lights Lr are, for example, laser light from a laser light source which generates laser light of a particular wavelength band. The reference lights Lr pass through a condensing element 7, comprised of a lens, and enter the photosensitive hologram material 58. In the example illustrated in FIG. 7, laser lights which are to make the reference lights Lr are in the form of parallel beams, parallel to the optical axis of the condensing element 7, when they enter the condensing element 7. The laser lights are shaped (converted) from the parallel beams to convergent beams by the condensing element 7, and such convergent reference lights Lr enter the photosensitive hologram material 58. The focal point FP of the convergent lights beams Lr lies in a position beyond the photosensitive hologram material 58. Thus, the photosensitive hologram material 58 is disposed between the condensing element 7 and the focal point FP of the convergent light beams Lr condensed by the condensing element 7.

The object lights Lo entering the photosensitive hologram material 58 are scattering lights from the scattering plate 6, e.g. made of opal glass. Since the hologram recording medium 57 is of a reflective type in the illustrated example, the object lights Lo enter the photosensitive hologram material 58 from the opposite surface to the surface which the reference lights Lr enter. The object lights Lo need to be coherent to the reference lights Lr. Therefore, it is possible to divide laser light emitted from the same laser source, and to use one of the divided lights as the reference lights Lr and the other as the object lights Lo.

In the example illustrated in FIG. 7, parallel light beams, which are parallel to the normal direction to the plate plane of the scattering plate 6, enter the scattering plate 6 and are scattered, and scattering light, i.e. the object lights Lo, which has passed through the scattering plate 6 enters the photosensitive hologram material 58. According to this method, when using an isotropic scattering plate, which is usually available at low cost, as the scattering plate 6, the object lights Lo from the scattering plate 6 can enter the photosensitive hologram material 58 with an approximately uniform distribution of the amount of light. Further, though depending on the degree of scattering of light by the scattering plate 6, the object lights to are likely to exit the entire light exit surface 6a of the scattering plate 6 and enter various positions on the photosensitive hologram material 58 in an approximately uniform amount of light. In such a case, it becomes possible for lights that have entered various positions on the resulting hologram recording medium 57 to each reproduce the image 5 of the scattering plate 6 with the same brightness. Further, the reproduced image 5 of the scattering plate 6 can be viewed with approximately uniform brightness.

When the hologram recording material 58 is thus exposed to the reference lights hr and the object lights Lo, an interference pattern is formed due to interference between the reference lights Lr and the object lights Lo. The interference pattern is recorded, in a certain form of pattern (e.g. a refractive-index modulation pattern in the case of a volumetric hologram), in the hologram recording material 58. Thereafter, the hologram recording material 58 is subjected to post-treatment adapted to the type of the hologram recording material 58, thereby obtaining a hologram recording material 55.

Figure 8:
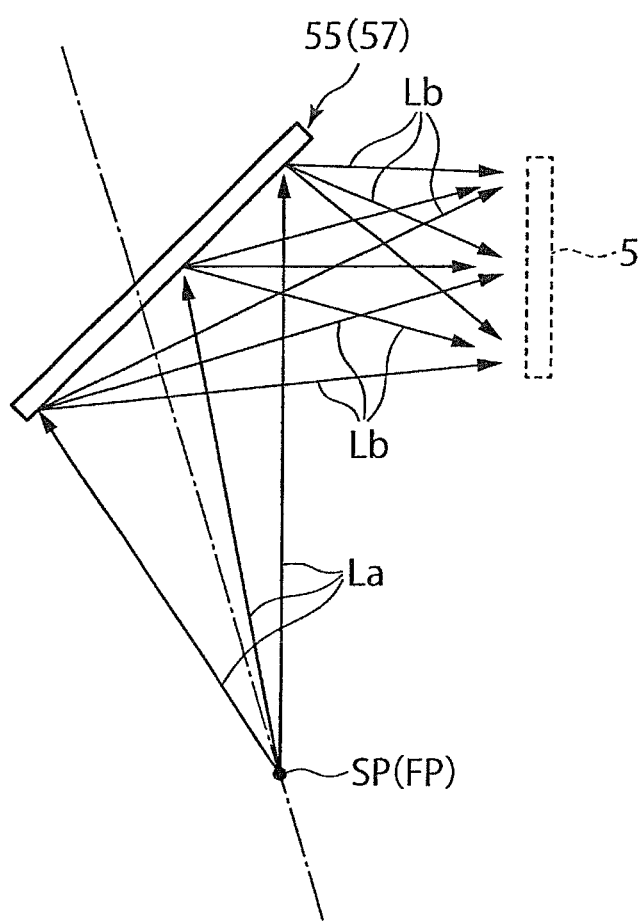
FIG. 8 is a diagram illustrating the action of the hologram recording medium produced through the exposure method of FIG. 7.

FIG. 8 illustrates the diffraction action (reproduction action) of the hologram recording medium 57 obtained through the exposure process of FIG. 7. As shown in FIG. 8, for the hologram recording medium 57 produced from the photosensitive hologram material 58 of FIG. 7, the Bragg condition is met by light which has the same wavelength as the laser It used in the exposure process and which travels along the light path, along which the reference lights Lr traveled in the exposure process, but in the opposite direction. Thus, as shown in FIG. 8, divergent light beams as reproducing illumination lights La, having the same wavelength as the reference lights Lr used in the exposure process and diverging from a reference point SP positioned with respect to the hologram recording medium 57 in the same positional relationship as the relative position (see FIG. 7) of the focal point FP with respect to the photosensitive hologram material 58 in the exposure process, are diffracted by the hologram recording medium 57 and form the reproduced image 5 of the scattering plate 6 at a particular position located with respect to the hologram recording medium 57 in the same positional relationship as the relative position (see FIG. 7) of the scattering plate 6 with respect to the photosensitive hologram material 58 in the exposure process.

The reproducing lights Lb (after diffraction of the reproducing illumination light La at the hologram recording medium 57) which are to form the reproduced image 5 of the scattering plate 6 travel along the light paths, along which the object lights Lo traveled from the scattering plate 6 to the photosensitive hologram material 58 during the exposure process, in the opposite direction and reproduce various points of the image 5 of the scattering plate 6. As described above and as shown in FIG. 7, the scattering lights Lo, exiting various positions on the light exit surface 6a of the scattering plate 6 during the exposure process, diverge such that the divergent light fluxes each enter the approximately entire area of the photosensitive hologram material 58. Thus, object lights Lo from the entire area of the light exit surface 6a of the scattering plate 6 enter a position on the photosensitive hologram material 58. As a result, information on the entire light exit surface 6a is recorded in various positions on the hologram recording medium 57. Therefore, the divergent light beams shown in FIG. 8, diverging from the reference point SP and which function as the reproducing illumination lights La, enter various positions on the hologram recording medium 57 and can respectively reproduce the images 5 of the scattering plate 6, having the same contour, at the same position (the illumination region LZ).

The use of the optical element 50 using such hologram recording medium 57 can achieve the same effects as the above-described embodiment. In the example illustrated in FIGS. 6 through 8, the hologram recording medium 57 constituting the optical element 50 is configured as a reflective volumetric hologram; however, it is also possible to use a transmissive volumetric hologram, or to use a relief hologram.

As shown in FIG. 6, the optical element 50 may further comprise an intermediate region Z3 lying adjacent to and between the first region Z1 and the second region Z2. In this embodiment, the polarization control means 70 disposed on the conjugate plane B further comprise an intermediate region CZ3 lying adjacent to and between the first control region CZ1 and the second control region CZ2. Further, as shown in FIG. 6, a light absorber 79 for absorbing light may be provided on the light path of the light traveling toward the intermediate region Z3 or on the light path of the light traveling toward the illumination region LZ (the spatial light modulator 30) after entering the intermediate region Z3. The light absorber 79 may be exemplified by a cured resin containing a black pigment, and a black metal oxide. According to this embodiment, light that forms a first modulated image can be made to be more securely composed of a first polarization component, and light that forms a second modulated image can be made to be more securely composed of a second polarization component. This enables display of a more stable 3D image.

Instead of or in addition to the provision of the light absorber 79, it is possible for the irradiation device 60 to emit light intermittently so that light will enter the first region Z1 and the second region Z2, and will not enter the intermediate region Z3. That is, it is possible for the irradiation device 60 not to emit light for such a time that if light were emitted from the irradiation device 60 during the time, the light would be caused to enter the intermediate region Z3 by the scanning device 65. Also according to this embodiment, light that forms a first modulated image can be made to be more securely composed of a first polarization component, and light that forms a second modulated image can be made to be more securely composed of a second polarization component.

Though the optical element 50 is halved vertically into the first region Z1 and the second region Z2 in the embodiment illustrated in FIG. 1, the present invention is not limited such construction. For example, in the case where coherent light scans the optical element 50 along a circumferential scan path, the optical element 50 may be divided along the circumferential scan path into quarters: two first regions Z1 and two second regions Z2. It is also possible to arrange first regions Z1 and second regions Z2 alternately in a stripe pattern or a grid pattern.

Though in the above-described embodiment the conjugate plane A on which the optical element 50 is disposed is parallel to the conjugate plane B on which the polarization control means 70 are disposed, the present invention is not limited to such construction: In one variation, as shown in FIG. 6, the conjugate plane A on which the optical element 50 is disposed may not be parallel to the conjugate plane B on which the polarization control means 70 are disposed. The embodiment shown in FIG. 6 can achieve the same effects as the above-described embodiment.

Though in the above-described embodiment the irradiation device 60 emits light toward the optical element 50 in such a manner that the light travels along a light path of a light beam constituting a divergent light flux, the present invention is not limited to this feature: In one variation, the irradiation device 60 may emit light toward the optical element 50 in such a manner that the light travels along a light path of a light beam constituting a parallel light flux.

Though in the above-described embodiment the irradiation device 60 emits coherent light, the present invention is not limited to this feature: The irradiation device 60 may emit non-coherent light.

Figure 9:
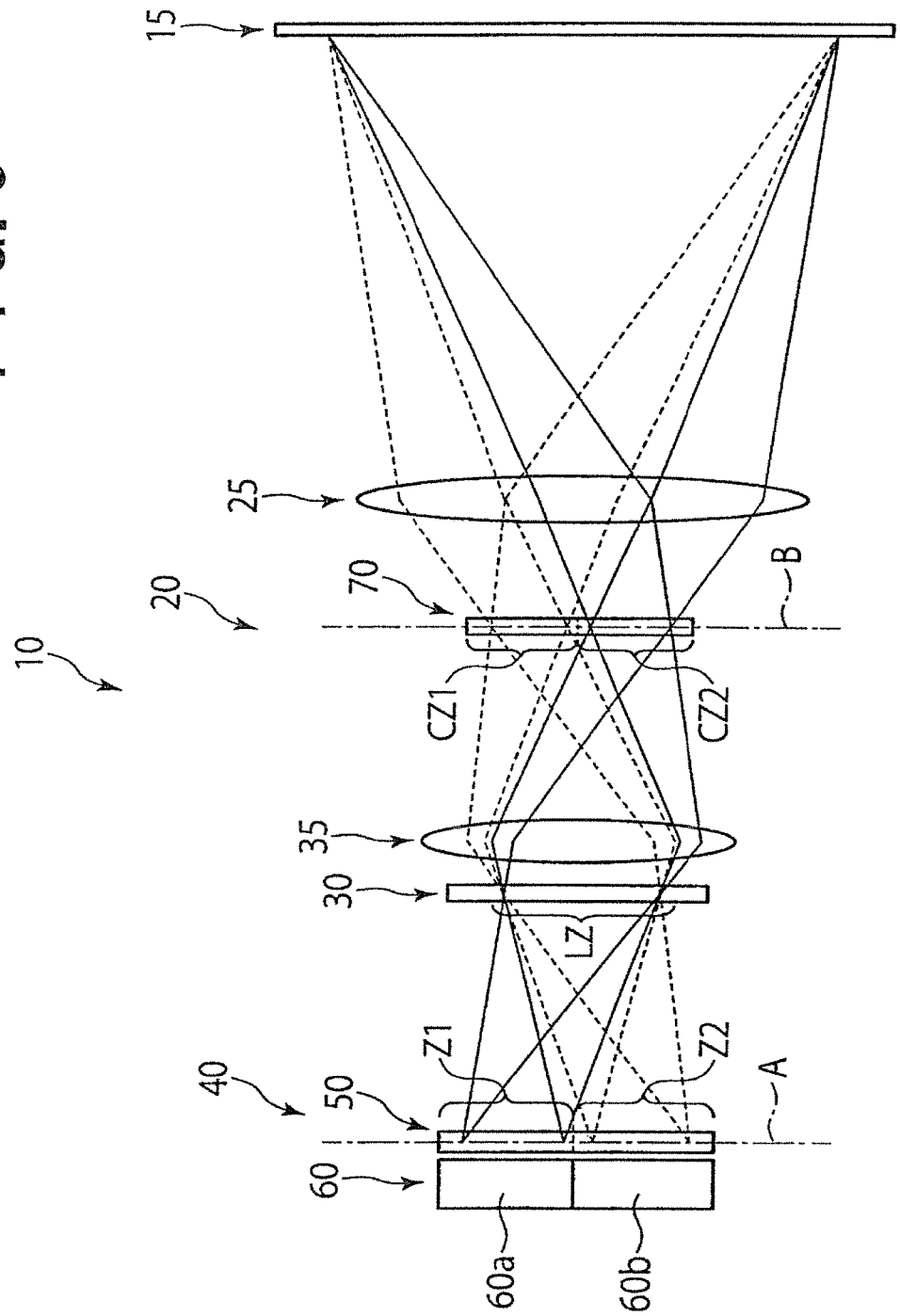
FIG. 9 is a diagram corresponding to FIG. 1, illustrating a variation of the irradiation device.

Though in the above-described embodiment the irradiation device 60 emits light in such a manner that the emitted light scans the optical element 50, the present invention is not limited to this feature. As shown in FIG. 9, the irradiation device 60 may include a first light source 60a for illuminating the entire first region Z1 of the optical element 50, and a second light source 60b for illuminating the entire second region Z2 of the optical element 50; the first light source 60a and the second light source 60b emit light alternately. The use of such irradiation device 60 can achieve the same effects as the above-described embodiment.

In the embodiment illustrated in FIG. 4, the half-wavelength plate 71a as the first polarization control element 71 is disposed on the light entrance side of the quarter-wavelength plate 72a as the second polarization control element 72; however, the present invention is not limited to this feature. Thus, the quarter-wavelength plate 72a as the second polarization control element 72 may be disposed on the light entrance side of the half-wavelength plate 71a as the first polarization control element 71. In the embodiment illustrated in FIG. 5, the polarization control means 70 solely consists of the first polarization control element 71 comprised of the half-wavelength plate 71a disposed such that it overlaps with the first control region CZ1. However, the polarization control means 70 may also include a transparent layer 73 disposed such that it overlaps with the second control region CZ2. A low-retardation layer, such as a layer of glass or triacetyl cellulose (TAC), which does not significantly disturb the polarization state of light passing through the transparent layer 73 is preferably used as the transparent layer 73.

In yet another variation, the projector 20 may project colored image light. For example, when the irradiation device 60 emits white light as synthetic light of multiple wavelength bands and, in addition, the spatial light modulator 30 has a color filter, the projection display device can display a full-color image.

The modifications described above can of course be made in an appropriate combination to the above-described embodiments.

The invention claimed is:

1. A projector comprising:
   an optical element including first regions and second regions, the optical element diffusing light that has entered the regions;
   an irradiation device for irradiating the first regions and the second regions of the optical element with light in a time-divisional manner;
   polarization control means disposed on a plane which is conjugate to a plane on which the optical element is disposed; and
   a spatial light modulator disposed in a light path from the optical element to the polarization control means, the spatial light modulator being illuminated with light that has been diffused by the first regions of the optical element and illuminated with light that has been diffused by the second regions of the optical element,
   wherein the polarization control means control a polarization state of light so that light that has been diffused by the first regions of the optical element and later exited the spatial light modulator becomes light of a first polarization component, and light that has been diffused by the second regions of the optical element and later exited the spatial light modulator becomes light of a second polarization component which differs from the first polarization component.

2. The projector according to claim 1,
   wherein the irradiation device irradiates the optical element with light in such a manner that the light scans the optical element, and
   wherein lights that have entered the optical element at various positions in each of the first regions and have been diffused each illuminate the spatial light modulator, and lights that have entered the optical element at various positions in each of the second regions and have been diffused each illuminate the spatial light modulator.

3. The projector according to claim 1,
wherein the irradiation device includes a first light source for irradiating the first regions of the optical element with light, and a second light source for irradiating the second regions of the optical element with light, the first light source and the second light source emitting light alternately.

4. The projector according to claim 1,
wherein the optical element includes a hologram recording medium.

5. The projector according to claim 1,
wherein the optical element includes a lens array.

6. The projector according to claim 1,
wherein the irradiation device emits linearly-polarized light whose vibration direction is constant, and
wherein the polarization control means include a half-wavelength plate provided on a light path of light that has been diffused by the first regions of the optical element.

7. The projector according to claim 6,
wherein the polarization control means further include a quarter-wavelength plate provided on a light path of light that has been diffused by the first regions of the optical element, and on a light path of light that has been diffused by the second regions of the optical element.

8. The projector according to claim 1,
wherein the irradiation device emits circularly-polarized or elliptically-polarized light whose circling direction is constant, and
wherein the polarization control means include a half-wavelength plate provided on a light path of light that has been diffused by the first regions of the optical element.

9. The projector according to claim 1,
wherein the irradiation device emits non-polarized light, and
wherein the polarization control means include a first polarizing plate provided on a light path of light that has been diffused by the first regions of the optical element, the first polarizing plate selectively transmitting the first polarization component, and a second polarizing plate provided on a light path of light that has been diffused by the second regions of the optical element, the second polarizing plate selectively transmitting the second polarization component.

10. A projection display device comprising:
the projector according to claim 1; and
a screen onto which a modulated image formed on the spatial light modulator is projected.

* * * * *